United States Patent [19]

Howard et al.

[11] Patent Number: 6,162,411
[45] Date of Patent: Dec. 19, 2000

[54] PRODUCTION OF FULLERENIC SOOT IN FLAMES

[75] Inventors: Jack B. Howard, Winchester; John B. Vander Sande, Newbury; K. Das Chowdhury, Cambridge, all of Mass.

[73] Assignee: Massachusetts Institute of Technology, Cambridge, Mass.

[21] Appl. No.: 09/292,068

[22] Filed: Apr. 14, 1999

Related U.S. Application Data

[63] Continuation of application No. 08/712,151, Sep. 11, 1996, Pat. No. 5,985,232, which is a continuation of application No. 08/220,232, Mar. 30, 1994, abandoned.

[51] Int. Cl.[7] ................................................. C01B 31/02
[52] U.S. Cl. .............................. 423/445 B; 423/445 R; 423/449.1; 423/450; 423/452
[58] Field of Search ........................ 423/445 B, 445 R, 423/447.3, 447.6, 447.5, 447.7, 449.1, 450, 452

[56] References Cited

U.S. PATENT DOCUMENTS 5,985,232  11/1999  Howard ........................ 423/445 B

OTHER PUBLICATIONS

Ajayan et al., "Opening carbon nanotubes with oxygen and implications for filing," *Nature* 362:522–525 (1993).

Atamny et al., "Micromorphology of carbon black," *Carbon*, 30:1123–1126 (1992).

Austin, "Crystal structural properties of carbon blacks," *Proceedings of the Third Conference on Carbon*, 389–394 (1959).

Ban et al., "Petroleum derived carbons: ACS symposium series," 21:358–377 (1976).

Baum et al., "Fullerence ions and their relation to PAH and soot in low–pressure hydrocarbon flames," *Ber. Bunsenges Phys. Chem.* 96(7):841–857 (1992).

Burgess et al.,"Vulcanizate performance as a function of carbon black morphology," *Presented to ACS Rubber Division* (1970).

Creasy et al.,"Fullerene molecular weight distributions in graphite soot extractions measured by laser desorption fourier transform mass spectrometry," *J. Phys. Chem.* 97(5):973–979 (1993).

Curl et al., "Fullerenes," *Sci. Am.*, pp. 54–63 (1991) (Oct. 1991).

Donnet, "Structure and reactivity of carbons: From carbon black to carbon composites," *Carbon* 20(4):267–282 (1982).

Donnet et al.,"Carbon black: Physics, chemistry and elastomer reinforcement," 87–111, 206–211 (1976).

Dravid et al., "Buckytubes and derivatives: their growth and implications for buckyball formation," *Science*, 259:1601–1604 (1993).

Dresselhaus, "Down the straight and narrow," *Nature* 358:195–196, (1992) (Jul. 16, 1992).

Ebbesen et al., "Large–scale synthesis of carbon nanotubes," *Nature* 358:220–222 (1992).

Ebert et al., "Is soot composed predominantly of carbon clusters?" *Science* 247:1468–1471 (1990).

(List continued on next page.)

*Primary Examiner*—Tom Dunn
*Assistant Examiner*—Peter DiMauro
*Attorney, Agent, or Firm*—Clark & Elbing LLP; Mary Rose Scozzafava

[57] ABSTRACT

A method for the production of fullerenic nanostructures is described in which unsaturated hydrocarbon fuel and oxygen are combusted in a burner chamber at a sub-atmospheric pressure, thereby establishing a flame. The condensibles of the flame are collected at a post-flame location. The condensibles contain fullerenic nanostructures, such as single and nested nanotubes, single and nested nanoparticles and giant fullerenes. The method of producing fullerenic soot from flames is also described.

14 Claims, 9 Drawing Sheets

OTHER PUBLICATIONS

Ebert, "The interrelationship of $C_{60}$, soot and combustion," *Carbon* 31:999–1001 (1993) (May 25, 1993).

Endo et al., "Formation of carbon nanofibers," *J. Phys. Chem.*, 96(17):6941–6944 (1992) (no month).

Frenklach et al., "Comment on the proposed role of speroidal carbon clusters in soot formation," *J. Phys. Chem.*, 92:561–563 (1988) (no month).

Ge et al., "Vapor condensation generation and STM analysis of fullerene tubes," *Science* 260:515–518 (1993) (Apr. 23, 1993).

Haynes et al., "Soot formation," *Prog. Energy Combust. Sci.* 7:229–273 (1981).

Heckman et al., "Progressive oxidation of selected particles of carbon black: Further evidence for a new microstructural model," *Rubber Chemistry and Technology*, 39(1):1–13 (1966).

Heckman, "Microstructure of carbon black," *Rubber Chemistry and Technology* 37(5):1245–1298 (1964) (Dec. 1964).

Hess et al., "Carbon black morphology," *Rubber Chem. Tech.*, 42:1209 (1969).

Hess et al., "Specific shape characterization of carbon black primary units," *Presented to Rubber Division*, (1972).

Howard, "Dispersal of carbon blacks to individual crystallites," *J. Phys. Chem.* 71:1965–1966 (1967).

Howard et al., "Fullerenes $C_{60}$ and $C_{70}$ in flames," *Nature* 352:139–141 (1991) (Jul. 11, 1991).

Howard et al., "Fullerenes synthesis in combustion," *Carbon* 30(8):1183–1201 (1992) (no month).

Howard, "Fullerenes formation in flames," $24^{th}$ *Symposium on combustion*, 933–946 (1992) (no month).

Howard et al., "Production of $C_{60}$ and $C_{70}$ fullerenes in benzene–oxygen flames," *J. Phys. Chem.*, 96:6657–6662 (1992) (no month).

Iijima, "Direct observation of the tetrahedral bonding in graphitized carbon black by high resolution electron microscopy," *J. Crys. Growth*, 50:675–683 (1980) (no month).

Iijima, "Helical microtubules of graphitic carbon," *Nature* 354:56–58 (1991).

Iijima et al., "Pentagons, heptagons and negative curvature in graphite microtuble growth," *Nature* 356:776–778 (1992) (Apr. 30, 1992).

Iijima, "The 60–carbon cluster has been revealed!" *J. Phys. Chem.*, 91:3466–3467 (1987).

Kroto, "Carbon onions introduce new flavour to fullerene studies," *Nature* 359:670–671 (1992) (Oct. 1992).

Kroto et al., "The formation of quasi–icosahedral spiral shell carbon particulates," *Nature* 331:328–331 (1988) (Jan. 28, 1988).

Lam et al., "The behavior of polycyclic aromatic hydrocarbons during the early stages of soot formation," $22^{nd}$ *Symposium on Combustion*, 323–332 (1988) (no month).

Lamb et al., "Extraction and STM imaging of spherical giant fullerenes," *Science* 255:1413–1416 (1992).

Marsh, "Quantitative micrography of carbon black microstructure," *Carbon* 9:797–805 (1971).

Marr "PAH chemistry in a jet–stirred/plug–flow reactor system," *Doctoral Chemical Engineering Thesis*, Table of Contents only (1993) (Jun. 7, 1993).

Marr "PAH chemistry in a jet–stirred/plug–flow reactor system," *Doctoral Chemical Engineering Thesis*, Table of Contents only (1993) (Jun. 7, 1993).

Maiti et al., "Structure and energetics of single and multilayer fullerene cages," *Phys. Rev. Lett.*, 70(20):3023–3026 (1993) (May 17, 1993).

Marsh, "Carbon blacks produced in a detonation wave from propylene," *Fuel*, 59:69–70 (1980).

Maruyama et al., "Thermionic emission from giant fullerenes," *Z. Phys. D.*, 19:409–412 (1991).

McKay et al., "Simulated transmission electron microscope images and characterisation of concentric shell and icospiral graphitic microparticles," *J. Chem. Soc. Faraday Trans.*, 88(19):2815–2821 (1992), no month.

Parker et al., "High–yield synthesis, separation, and mass–spectrometric characterization of fullerenes $C_{60}$ to $C_{266}$," *J. Am. Chem. Soc.* 113:7499–7503 (1991).

Palmer et al., "The formation of carbon from gases," *Chemistry and physics of carbon* 1:265–321 (1965).

Rivin, "Surface properties of carbon," *Rubber chemistry and technology*, 44(2):307–343 (1971).

Schaffer et al., "Structure and properties of carbon black: Changes induced by heat treatment," *Ing. Eng. Chem.* 45(8):1721–1725 (1953).

Seraphin et al., "Effect of processing conditions on the morphology and yield of carbon nanotubes," *Carbon*, 31(5):685–689 (1993).

Seraphin et al., "Morphology and yield of carbon clusters in arc–discharge deposits," *Carbon* 31(7) 1212–1216 (1993) (Jul. 28, 1993).

Smart et al., "Extraction of giant fullerene molecules and their subsequent solvation in low boiling point solvents," *Chem. Phys. Lett.* 188(3/4):171–176 (1992) (Jan. 10, 1992).

Smith, "Carbon black," *Encyclopedia of Chemical Technology*, 4:244–254 (1964).

Tsang et al., "Thinning and opening of carbon nanotubes by oxidation using carbon dioxide," *Nature* 362:520–522 (1993).

Ugarte, "Curling and closure of graphitic networks under electron–beam irradiation," *Nature* 359:707–709 (1992) (Oct. 22, 1992).

Wang et al., "Packing of $C_{60}$ molecules and related fullerenes in crystals: a direct view," *Chem. Phys. Lett.*, 182(1):1–3,(1991).

Werner, H., "Spectroscopic and chemical characterisation of fullerene black," *Chemical Physics Letters*, 194(1,2):62–66 (1992).

Yamada et al., "Structure and formation process of carbon blacks formed by decomposing SiC powder using a conicallly converging shock–wave technique," *Carbon*, 27(6):845–852 (1989).

Zhang et al., "Reactivity of large carbon clusters: spheroidal carbon shells and their possible relevance to the formation and morphology of soot," *J. Phys. Chem.* 90(4):525–528 (1986) (Feb. 13, 1986).

"Spectroscopic and chemical characterisation of fullerene black," *Chemical Physics Letters*, 194(1/2):62–66 (Jun. 19, 1992).

PRODUCTION OF FULLERENIC SOOT IN FLAMES

This application is a continuation of U.S. Ser. No. 08/712,151 filed Sep. 11, 1996, entitled "Production of Fullerenic Nanostructures in Flames", now U.S. Pat. No. 5,985,232 which is a continuation of U.S Ser. No. 08/220,232 filed Mar. 30, 1994, now abandoned with the same title.

BACKGROUND OF THE INVENTION

The present invention relates to fullerenic nanostructures and a method of their production. Fullerene $C_{60}$ and $C_{70}$, closed-cage carbon compounds containing both six-member and five-member rings and an even number of carbon atoms, were first reported by Kroto et al. in carbon vapor produced by laser irradiation of graphite, a "carbon vaporization" technique (Nature 318 162–164 (1985)). Since then, the number of known fullerenes has rapidly expanded from $C_{60}$ and $C_{70}$, to include $C_{76}$, $C_{78}$, $C_{84}$ and larger structures, including "giant fullerenes", characterized as having $C_n$ with $n \geq 100$, nanotubes and nanoparticles.

The composition and structure of the larger fullerenic structures or "nanostructures" have generated considerable attention. Experimental evidence suggests that giant fullerenes are formed along with smaller fullerenes in carbon vaporization systems. Carbon clusters up to $C_{632}$, all even numbered and interpreted to be fullerenes, were observed in molecular beam mass spectrometer (MBMS) analysis of the vapor from laser vaporization of graphite. Mass spectroscopy of solvent extracts of soot from electrical vaporization of carbon rods showed species interpreted to be $C_{188}$, $C_{208}$ and $C_{266}$. Transmission electron microscopy (TEM) of crystals consisting largely of $C_{60}$ revealed apparently ellipsoidal fullerenes estimated to be ~$C_{130}$. Scanning tunneling microscopy (STM) of extracts of soot from electrical vaporization of carbon showed spheres of 1 to 2 nm van der Waals (vdW) diameter which may correspond to fullerenes up to $C_{330}$.

Multiple polyhedral shells separated by about 0.34 nm (close to the interlayer spacing of graphite) and exhibiting spheroidal, elongated and tubular shapes also have been observed by TEM. These multishelled polyhedrons were given the name "nested polyhedrons" because the innermost shell was "nested" within the polyhedral shell of larger dimension. Nested spheroidal polyhedron shells of carbon were first observed by Iijima in carbon deposited from an arc discharge at $10^{-7}$ torr (J. Phys. Chem. 91, 3466–7 (1987)). The central shells ranged from ~1 nm diameter to much larger, some containing one- and two-layered giant fullerenes equivalent to ~$C_{3700}$ and larger. Subsequently, strikingly spherical onion structures with up to ~70 shells were produced by intense electron-beam irradiation of carbon soot collected from an arc-discharge apparatus. Nested spheres and polyhedral spheroids 5–20 nm in diameter and other polyhedrons of approximately triangular, tetragonal, pentagonal and hexagonal cross section have also been observed. Nanostructures formed on the cathode during arc-discharge carbon vaporization include tubes with 2 to about 50 nested shells. The tubes are capped by polyhedral domes, sometimes having conical transitions to the cylindrical tube wall. All of these nanostructures contain the feature associated with fullerenes of a structure containing both six-member and five-member carbon rings.

Carbon vaporization processes, while capable of making a wide variety of fullerenic structures, are very inefficient and not amenable to large scale production. It is desirable to develop a manufacturing process that is efficient and capable of processing large amounts of fullerenic nanostructures.

Fullerenes $C_{60}$ and $C_{70}$ have been successfully synthesized and collected in flames by Howard et al. (Nature 352, 139–141 (11 Jul. 1991)). Evidence of high molecular weight ionic species consistent with an interpretation as being fullerenic structures was observed in low-pressure premixed benzene and acetylene flames (Baum et al., Ber. Bunsenges. Phys. Chem. 96, 841–857 (1992)). The presence of neutral giant fullerene molecules in flames has not been established, however.

It is an object of the invention to provide a method for synthesizing fullerenic nanostructures in flames. It is a further object to provide a method for synthesizing fullerenic nanostructures having both ends of the nanostructure capped. It is yet a further object of the invention to describe a method for production of soot having a high fullerenic carbon content.

SUMMARY OF THE INVENTION

In one aspect of the invention, a fullerenic nanostructure is prepared by establishing a flame by combustion of an unsaturated hydrocarbon fuel and oxygen in a burner chamber at sub-atmospheric pressures. Condensibles of the flame containing the fullerenic nanostructures are collected at a post-flame location. The fullerenic nanostructures include nanotubes, nested nanotubes, nanoparticles and giant fullerenes and nested fullerenes, $C_n$, where $n \geq 100$. The nanoparticles may be spherical or spheroidal. The fullerenic nanostructures thus produced have at least one diameter in the range of 0.7 to 1000 nm.

In yet another aspect of the invention, a fullerenic nanotube is prepared by establishing a flame by combusting an unsaturated hydrocarbon fuel and oxygen in a burner chamber at a sub-atmospheric pressure where the flame conditions are sufficient to produce a fullerenic nanotube. The fullerenic nanotube is characterized in that the fullerenic nanotube is closed at both ends by spheroidal caps of fullerenic carbon. Condensibles of the flame containing the fullerenic nanotubes are collected at a post-flame location.

In preferred embodiments, the fuel may be combusted in a laminar flame or in a turbulent flame. The combustion process may use a premixed or diffusion flame. The combustion process may use a one-dimensional flame. In preferred embodiments, the burner chamber pressure is in the range of 20 to 300 torr, and more preferably 80 to 200 torr; the diluent concentration is in the range of 0 –50 vol %; the carbon to oxygen ratio (C/O) is in the range of 0.85 to 1.10; and the gas velocity is in the range of 25 to 50 cm/sec. Preferred diluents include argon, nitrogen, carbon dioxide, steam, flue gases and mixtures thereof.

In a preferred embodiment, a catalyst is introduced into the flame to promote the formation of single shell fullerenic nanostructures. Preferred catalysts include iron, cobalt, nickel, calcium, magnesium, manganese, potassium, rubidium and strontium. Iron, cobalt and nickel are particularly preferred. In another preferred embodiment, a portion of the unsaturated hydrocarbon fuel may be completely or partially substituted by a second fuel. The unsaturated hydrocarbon fuel may be introduced at a post flame location or at a transition between a post-flame and oxidation zone.

In yet another aspect of the invention, a fullerenic nanostructure is made by combusting an unsaturated hydrocarbon fuel and oxygen in a burner chamber at a sub-atmospheric pressure, thereby establishing a flame. The flame condition is sufficient to obtain a fullerenic nanostructure at a post-flame location. An oxidizing agent is introduced into the flame at a location downstream from the post-flame location. The oxidizing agent is selected such that non-fullerenic nanostructures are oxidized. Condensibles of the flame are collected at a location downstream from the point of introduction of said oxidizing agent. The condensibles are thereby enriched in fullerenic nanostructures.

In another aspect of the invention, a fullerenic nanostructure is made by combusting an unsaturated hydrocarbon fuel and oxygen in a burner chamber at a sub-atmospheric pressure, thereby establishing a flame. The flame conditions are sufficient to produce a fullerenic nanotube at a post-flame location, where the fullerenic nanotube is closed at both ends by spheroidal caps of fullerenic carbon. And oxidizing agent is introduced into the flame at a location downstream from the post-flame location, such that end caps of the fullerenic nanotubes are oxidized to open the ends of the fullerenic nanotubes. The condensibles of the flame are collected at a location downstream from the point of introduction of said oxidizing agent, the condensibles comprising open-end fullerenic nanotubes.

In yet another aspect of the invention, soot is prepared by combusting an unsaturated hydrocarbon fuel and an oxygen source, thereby establishing a flame, and collecting soot of the flame at a post-flame location, the soot comprising at least 50 wt %, and preferably 90 wt %, fullerenic carbon sheets. In preferred embodiments, combustion is carried out in a burner chamber at a sub-atmospheric pressure. In yet another preferred embodiment, combustion may be carried out in a laminar or turbulent flame. In another preferred embodiment, the chamber pressure is at atmospheric pressure, the hydrocarbon fuel is ethylene and the oxygen source is air.

Yet another aspect of the invention includes a nested nanoparticle having a plurality of shells in the range of 5 to 1500 shells, characterized in that the outermost shell is substantially spherical and in that the innermost shell is an elongated polyhedral.

Yet another aspect of the invention includes a soot comprising greater than 50 wt %, and preferably, 90 wt % fullerenic carbon sheets.

Definitions of Terms Used

By "condensibles", as used herein, it is meant a product of the combustion process which is collected as a solid or liquid from the flame. Condensibles may include particles formed within the flame or during the collection process, such as soot or fullerenic structures or polycyclic aromatic hydrocarbons (PAH). Condensibles may include vapors which are collected as they exit the flame. The vapors may be rapidly quenched by the probe used to collect the condensibles from the flame.

By "fullerenic nanostructure" or "nanostructure" as those terms are used herein, it is meant a closed cage structure made up of five-member and six-member, an in some cases, seven-member, carbon rings having at least one dimension on the order of nanometers. These dimensions are typically beyond those associated with a molecule, although the atomic interactions within the nanostructure may be covalent in nature.

By "nanotube", as that term is used herein, it is meant a closed-cage carbon structure made up of five-member and six-member, and in some cases, seven-member carbon rings which possesses an elongated axis in the nanometer range. The nanotubes are typically closed at one or both ends by spheroidal "caps" of fullerenic carbon. The term "nanotube" is typically applied when the aspect ratio of the elongated axis to the other dimensions is greater than 10. The nanotube may have a single shell. The inner nanotube may be surrounded by or "nested" within a number of concentric and increasingly larger tubes or particles, which is known as a "nested nanotube".

By "nanoparticle" as that term is used here, it is meant a closed-cage carbon structure made up of five-member and six-member, and in some cases, seven-member carbon rings that is of approximately the same dimensions along all axes. The nanoparticle may have a single shell. The inner nanoparticle may be surrounded by or "nested" within a number of concentric and increasingly larger particles, which is known as a "nested nanoparticle". The innermost region within the fullerenic structure is often referred to as the "core".

"Spherical" and "spheroidal" are used in the conventional sense. Spherical is used to describe structures whose surface is of approximately constant curvature and whose surface is at all points equidistant from the center. Spheroidal is used to describe structures that are generally sphere-like, but elongated along one or more axes. Spheroidal structures are to be distinguished from the more anisotropic nanotubes. Spherical structures may be polyhedral, having a relatively high curvature at the edges (where two faces meet) and vertices (where three faces meet).

The term "shell" is used to describe the curved fullerenic surfaces which can be ordered so as to form nested structures. The use of the term "shell" is inclusive of both open and closed structures. The terms "closed shells" and "open shells" are used when it is relevant to the discussion to distinguish between the two.

The term "fullerenic soot" is used herein to describe spheroids or spherules of carbon made up curved carbon sheets which have substantial fullerenic character. The spherules have dimensions similar to conventional carbon black and thermal black, that is, in the range of 5 nm to 1000 nm. Fullerenic character is noted by the presence of five-member carbon rings which result in curved sheets of carbon. Fullerenic soot is made up of spherules of curved carbon sheets which are stacked or nested within other carbon sheets of similar geometry.

The practice of the present invention gives a large-scale production of fullerenic nanostructures and provides previously unknown nanostructures. The practice of the invention also provides large scale production of fullerenic soot.

BRIEF DESCRIPTION OF THE DRAWINGS

The novel features of the invention both as to its features and operation is best understood from the accompanying drawings, taken in conjunction with the accompanying description, in which.

DESCRIPTION OF THE PREFERRED EMBODIMENT

The applicants have discovered that nested fullerenic nanostructures and fullerenic soot may be synthesized in flames. The flame synthesis produces nested nanostructures which are dispersed in the gas phase and are not grown from a substrate. The nanostructures do not grow from a substrate and hence develop two capped ends ("doubly capped"). In contrast, arc-discharged synthesized nanostructures, particularly nanotubes, grow from the cathode and are capped on one end only ("singly capped"). In further contrast to the arc-discharge methods, flames operate at peak temperatures lower by ~2000 K and contain oxygen and hydrogen as well as carbon. The gas phase reactivity, reduced reaction temperatures and more complex mixture of reactive species in flame synthesis suggest a much different growth mechanism for the fullerenic nanostructures prepared in flames.

The fullerenic nanostructures which may be synthesized in flames include giant fullerenes, nanotubes and nanoparticles. Smooth, curving layers of fullerenic carbon sheets are also produced. Nanoparticles include closed cage carbon species having spherical, polyhedral and other more complicated shapes. Likewise, nanotubes include closed cage carbon species having a single elongated axis. Nanotubes typically have an aspect ratio of at least 10; however, aspect ratios of up to 20 have been observed and nanotubes with aspect ratios of up to 100 are contemplated. These observations are in no way limiting of the type of nanotubes which can be prepared in flames. Nanotubes of higher aspect ratios are within the scope of the invention.

Figure 1:
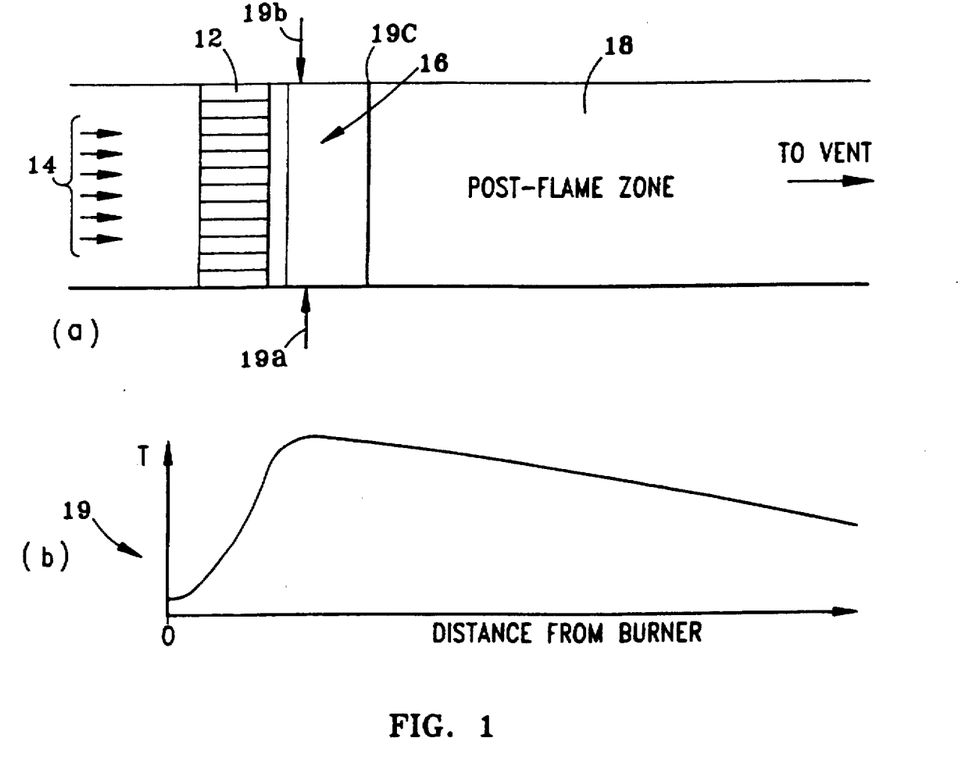
FIG. 1 is (a) a schematic view of a flame and (b) its temperature profile.

According to the method of the invention, an unsaturated hydrocarbon fuel and oxygen are burned to provide a flame (see, FIG. 1). In a preferred embodiment, one-dimensional or plug-flow (both terms refer to flames where the properties of flow, i.e, temperature, vary in one dimension only) laminar flames are stabilized on a flat drilled and water-cooled copper burner plate 12. A mixture 14 of hydrocarbon fuel and oxygen is fed with a uniform velocity profile. In the present instance, a burner plate having a diameter of 70 mm was used; however, this is in no way limiting of the invention. An "oxidation" zone 16 nearest the burner plate is at a high temperature. A post-flame zone 18 is at a further distance from the burner plate and consists of hot, but usually cooling, gases in which the extent of chemical reaction is much less than in the oxidation zone. The post-flame zone would include the tail of the flame. A temperature v. distance graph 19 positioned below the flame of FIG. 1 illustrates the change in flame temperature with distance from the burner plate. Additionally, stabilized flames may be surrounded by an annular non-sooting flame (not shown) which provides a thermal shield, giving an approximately one-dimensional core within which temperature and species concentrations vary only with distance from the burner surface.

The fuel and oxygen may be premixed prior to combustion (a premixed flame) or they may be separately introduced into the flame region through separate conduits 19a and 19b which promote mixing of the streams (diffusion flame). A burner plate is not used in the diffusion flame configuration. A laminar flame, where the motion of the fluid is streamlined and there is no erratic motion, is preferred. Benzene and acetylene may be used as the unsaturated hydrocarbon fuel in the combustion mixture. It is contemplated that other unsaturated hydrocarbons, such as by way of example and in no way limiting the scope of the invention, ethylene, toluene, propylene, butylene, naphthalene or other polycyclic aromatic hydrocarbons such as, in particular, petroleum, heavy oil and tar, may also be used in the method of the invention. It is understood that materials, for example, products derived from coal, kerogen and biomass, which are primarily hydrocarbon, but also contain some amounts of nitrogen, sulfur, oxygen and other elements, also are included.

An unsaturated hydrocarbon fuel may be used as the sole source of combustion heat for the flame. However, the unsaturated hydrocarbon fuel may be partially or completely substituted by another source of fuel. This may be desirable, where the alternative fuel is less expensive or a higher (or lower) temperature burning fuel. Where significant proportions of the unsaturated hydrocarbon fuel is substituted by a second fuel, the unsaturated fuel may then be introduced at another location in the flame region. In particular, it may be desirable to introduce the unsaturated hydrocarbon fuel at a transition region 19c between the oxidation zone and post-flame zone.

Burning of an unsaturated hydrocarbon fuel in a conventional turbulent flame is also within the scope of the invention. A turbulent flame is one where flow properties, such as temperature and velocity, fluctuate. A turbulent flame for use in the present invention may include a premixed turbulent ethylene/air flame at a pressure of substantially 1 atm; C/O of 0.73; flame temperatures in the range of 1705–1715 K; and residence time of reactive species in the flame of approximately 18.8 ms. The turbulent flame may be a premixed or diffusion flame. The unsaturated hydrocarbon fuel may be introduced at the burner or may be partially substituted by an alternative fuel at the burner with the balance introduced at a different location, such as at the transition between the oxidation and post-flame zones of the flame 19c.

A diluent may also be added to the combustion mixture. Suitable diluents include any non-combustible gas and is preferably, argon, nitrogen, helium, carbon dioxide, steam, flue gases and mixtures thereof. The diluent may be premixed with the combustion mixture or added separately to the flame. Preheating of the combustion mixture may be desired in some situations, i.e., when steam is used as a diluent to prevent condensation. The diluent has the following effects on the flame reaction, some or all of which may be significant in the production of fullerenic nanostructures. Flame diluent helps to prolong the lifetime of reactive intermediates, thereby increasing the probability of fullerene formation. For example, diluent may help promote reactions such as intermolecular rearrangement which form fullerene from non-fullerenic structures. Diluent also may help to provide more desirable temperature and concentration profiles or histories for the fullerene-forming reactions.

In preferred embodiments, the burner is in a low-pressure (sub-atmospheric) chamber exhausted into a vacuum pump. The burner chamber is maintained at low pressures and preferably is maintained at sub-atmospheric pressures. Suitable pressures are in the range of 20 to 300 torr total pressure, with pressure in the range of 80 to 200 torr most preferred. Low chamber pressure may promote fullerene formation at the expense of graphitic soot formation. Formation of fullerenic nanotubes are favored at higher pressures than those pressures preferred for fullerene $C_{60}$ and $C_{70}$ synthesis. By way of example, pressure of 40 torr is near optimum for $C_{60}$ and $C_{70}$, while pressure of 100 torr has been observed to be very good for the formation of nanotubes. It is expected that higher pressures in the range of up to 300 torr would prove optimal for the formation of fullerenic nanotubes and other nanostructures.

Flame temperatures are significantly lower than the temperatures used in arc-discharge carbon vaporization systems. Temperatures approximately range from 1700 K to 2100 K in the flame from a location of highest temperature to a distance of about 70 mm from the burner surface (see, FIG. 1). The flame temperature has the following effects on the flame reactions, some or all of which effects may be significant in the production of fullerenic nanostructures. The formation of fullerenic nanostructures involves many reactions with different temperature dependencies (i.e., different activation energies) and involves different reactants with different temperature dependencies (i.e., radical v. charged species). Similarly, the formation of undesirable by-products with which fullerenes compete for reactants have their own temperature dependencies. The effect of temperature on fullerenic nanostructure formation is the overall contribution of all these effects.

Flame operating conditions for the examples described below are set out in Table 1.

TABLE 1

| Flame operating conditions. | |
| --- | --- |
| flame condition | range |
| burner chamber pressure | 20–100 torr |
| C/O atomic ratio | 0.86–1.00 ($C_6H_6$) |
|  | 1.21 ($C_2H_4$) |
|  | 1.06 ($C_2H_2$) |
| gas velocity as burner (298 K) | 25–50 cm/s |
| diluent concentration | 0–44% |
| probe location | 2–7 cm from burner |
| temperature profile: | 1930–2050 K (at 2 cm) |
|  | 1600–1720 K (at 7 cm) |

Samples of soot and condensibles were collected at a given "post-flame" distance from the burner. Post-flame collection sites included two and seven centimeters "down stream" from the burner, as measured perpendicular from the burner surface to the orifice at the tip of the sampling probe. Vapor collection and quenching was accomplished by inserting a water-cooled quartz probe connected to a filter, vacuum pump, and gas meter into the flame vapor stream, rapidly withdrawing and cooling the vapors and collecting the condensable ("condensibles") on the in-line filter. Sample of condensibles were also collected from the water-cooled top surface of the combustion chamber against which the flame tail impinged.

Other methods of quenching and/or collecting condensibles containing fullerenic nanostructures are within the scope of the invention. By way of example only, condensibles may be collected by a water-cooled metal probe and gas-cooled probes of various configurations. The condensibles may be quenched and collected by aerodynamic cooling or by injection of a cold inert fluid into the flame stream, followed by filtration of the quenching fluid. Conventional collection techniques such as bag filtration, electrostatic separation and cyclone separation are also within the scope of the invention.

The presence of fullerenic nanostructures in the condensibles was determined by analysis of condensibles collected at different locations in the burner chamber by high resolution transmission electron microscopy (HRTEM). Condensibles were analyzed in a TOPCON 002B high resolution transmission electron microscope operated at 200 keV with a point resolution of 0.17 nm, a spherical aberration coefficient of 0.4 mm, and exposure times below the minimum for electron damage. A small portion of each sample of condensibles was dispersed in an organic solvent, such as toluene, using a mild sonication at room temperature for 20 minutes. Drops of suspension, including soluble extract and insoluble material, were placed on holey carbon transmission electron microscope grids and dried under vacuum, thus depositing all the sample material for HRTEM analysis. In some cases the suspension was filtered to eliminate soot particles, leaving only the extract for analysis.

Other methods for the observation and analysis of condensibles are within the scope of the present invention. A number of extraction and purification techniques are available to separate soluble fullerenic structures from soot residues. Simple and soxhlet extraction in solvent of varying polarity can preferentially extract fullerenic structures of particular mass ranges. The interested reader is directed to Creasy et al., *J Phys. Chem.* 97(5), 973–979 (1993); Smart et al, *Chem. Phys. Lett.* 188(3–4), 171–176 (1992); and Parker et al., *JACS* 113, 7499–7503 (1991) for further information, which are incorporated herein by reference. By way of example only, condensibles also may be separated by electrostatic separation techniques or by inertial separation which works by aerodynamic forces on the varying geometries and shapes of the nanostructures.

The flame-synthesized nanostructures observed by HRTEM included nested nanostructures with cylindrical, tubular, spherical, polyhedral and other shapes. The range of sizes and the variety of distinct shapes that can be produced by flame synthesis appears larger than for carbon vaporization. Under the conditions studied here, the nested nanostructures ranges from ~2 nm to ~30 nm in size. The structures are cylindrical, tubular, spherical, spheroidal, elongated, prolate and trigonous in shape with hollow core sizes ranging from ~1 nm to ~10 nm. The nested structures were observed having ~5 to ~35 shells; however, this in not intended to limit the scope of the invention. It is contemplated that the present method can provide nanostructures having up to 1500 shells. Nanostructures having a larger number of shells are within the scope of the invention. It is contemplated that optimization of flame synthesis condition can provide nested nanostructures of greater diameter and greater number of concentric and increasingly larger shells. In particular, chamber pressures in the range of 80 to 200 torr or higher and C/O of near 1.0 or somewhat higher are desired.

A discussion of the particular types of nanostructures obtained under specific flame conditions follows.

A low-pressure benzene-oxygen flame was established under the following flame conditions: chamber pressure of 20 torr; carbon to oxygen ratio (C/O) of 0.86 atomic ratio; an equivalence ratio [defined as "fuel/oxygen ratio in flame)/ (stoichiometric fuel/oxygen ratio corresponding to conversion of all carbon to $CO_2$ and all hydrogen to $H_2O$)"]of 2.15; gas velocity at burner (298 K) of 42 cm/s (fuel, oxygen and diluent inlet gases); and no diluent. Samples of condensibles were collected from 10 mm above burner and analyzed by high performance liquid chromatography (HPLC) and HRTEM.

Figure 2:
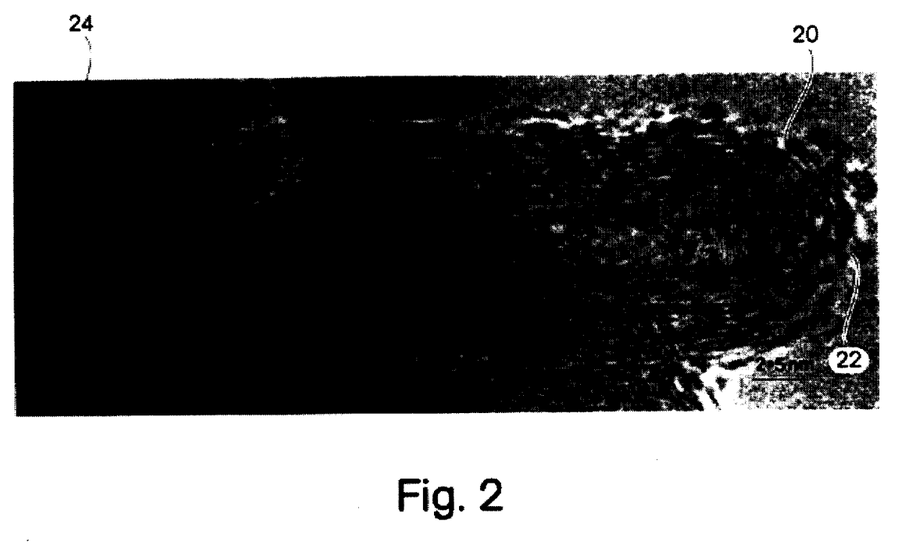
FIG. 2 is an electron micrographs of a fullerenic nanotube consisting of nested shells capped at both ends.

Fullerenes $C_{60}$ and $C_{70}$ were observed by both HPLC and HRTEM. HPLC not only permits identification of fullerenic species, but the separation and purification of the fullerenic species as well. The separation and identification of fullerenes $C_{60}$ and $C_{70}$ by HPLC is described in U.S. Pat. No. 5,273,729 to Howard et al. and is incorporated herein by reference. Observation by HRTEM established that the samples contained substantial quantities of giant fullerenes, double capped nested nanotubes, trigonous nested fullerenes and other nested polyhedrons. Fullerene molecules corresponding to $C_{78}$, $C_{94}$ and $C_{148}$ also were observed. FIG. 2 is an electron photomicrograph obtained by HRTEM of a nanotube 20 having ends closed by spheroidal caps 22 and 24. Nanotube 20 is about 40 nm long and about 4 nm in outside diameter. It has 11 or 12 shells and is close to perfect in shape. The tube walls are coaxial cylindrical shells with spheroidal end caps. The shells are separated by about 0.34 nm or slightly more.

Figure 3:
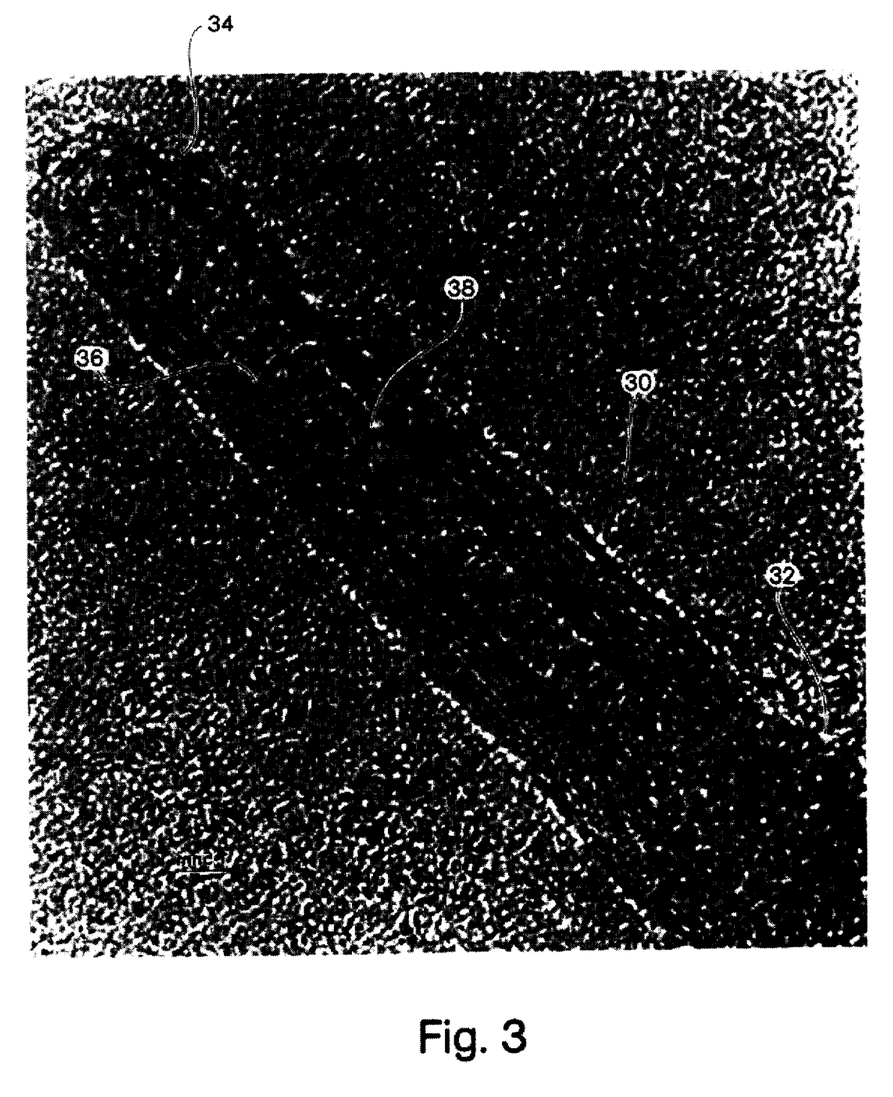
FIG. 3 is an electron micrograph of a multishelled fullerenic nanotube exhibiting lengthening at a capped end and thickening radially.

Nanotubes also were observed in condensibles collected from a benzene-oxygen flame under the following conditions: chamber pressure at 40 torr, C/O at 0.96; equivalence ratio at 2.4; gas velocity at 25 cm/s; and 10% argon diluent. The sample was extracted from deposits of condensibles which included soot obtained from the water-cooled top surface of the combustion chamber. The extract consisted of 50 wt % $C_{70}$, 30 wt % $C_{60}$ and 20 wt % other fullerenes and PAH. A nanotube 30 from this extract is shown in FIG. 3. The nanotube 30 appears to have grown from a right portion 32 to a left portion 34, with more than one shell forming simultaneously. The inner shells, 36 and 38, terminate leaving a compartment between themselves and the outer shell 34. Formation of end caps relative to lengthening of the cylindrical shell walls apparently was at first slow or otherwise unfavorable enough to leave compartments of significant length between caps. The onset of nested cap formation occurred when the diameter of the shell being capped was about 10 intershell separations, corresponding to a cap size of half of a $C_{1400}$ spheroidal single-shell fullerene.

Figure 4:
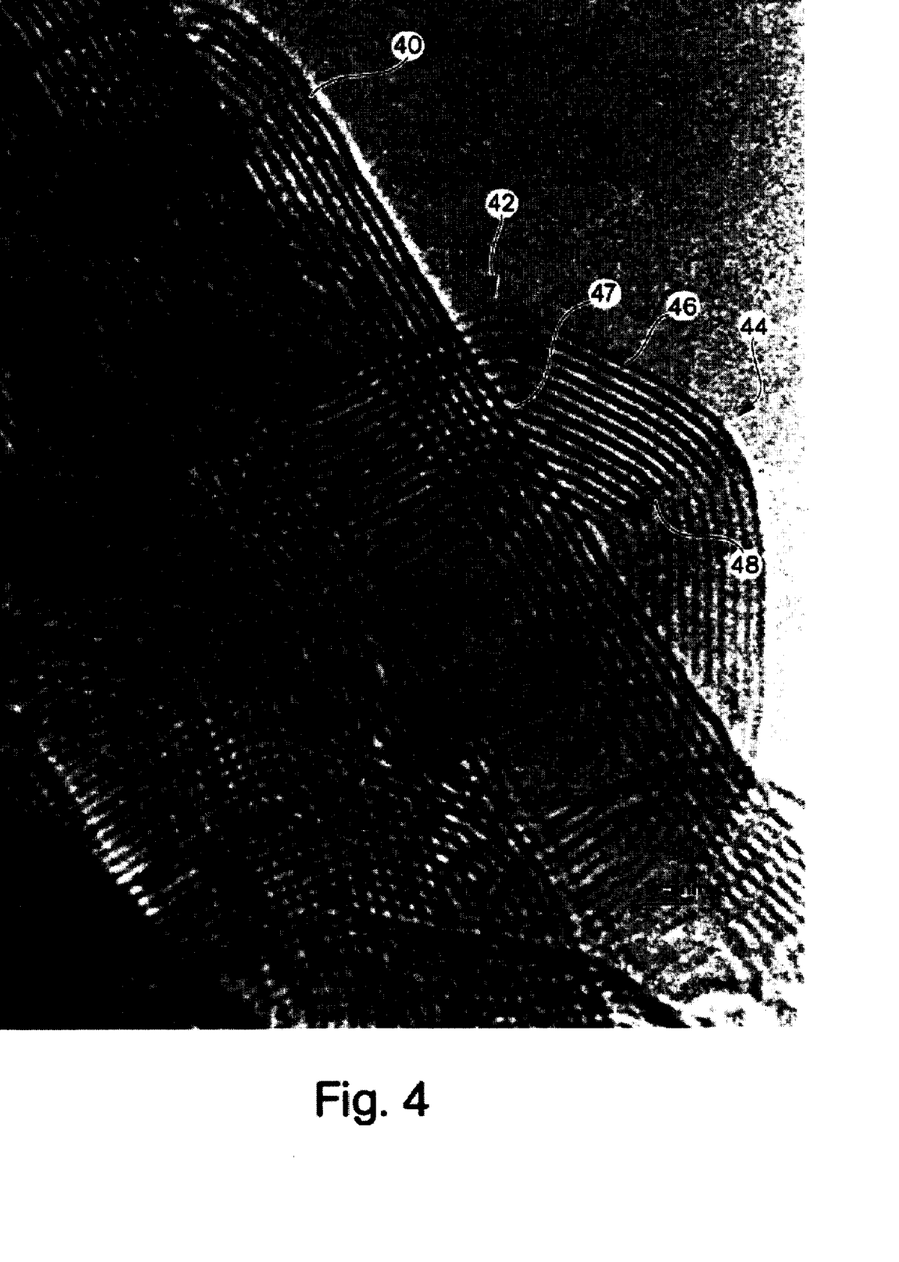
FIG. 4 is an electron micrograph of a fullerenic nanotube and a polyhedral nested nanoparticle.

The geometry being approached in nanotube 30 is exhibited at a more mature stage by a nanotube 40 shown in FIG. 4. This sample was prepared from a benzene-oxygen flame under the following conditions: P=97 torr, C/O=0.99, v=36 cm/s, 43.5% diluent (He/Ar=2.6); sample collected from combustion chamber surface. The sample contained about 10 wt % fullerenic nanostructures.

The present results show double capped nanotubes, such as nanotube 20 closed by end caps 22 and 24 (FIG. 1), whereas only singly capped nanotubes are seen in previous HRTEM images of carbon nanotubes prepared by carbon vaporization. Unlike tubes grown on the cathode surface in arc-discharge synthesis, tubes in the flame grow freely with both ends exposed to reactants. Therefore, it appears that the growth mechanism for nanostructures produced by arc-discharge and flame synthesis methods are very different.

The sample which contained the nanotube 40 of FIG. 4 also contained a large variety of fullerenic nanostructures, including spheroidal structures, polyhedral structures, spherical onion-like structures, prolate spheroidal structures and trigonous and conical structures. These nanostructures are described in detail, below.

Polyhedral structures, such as a nested polyhedral, spheroidal fullerenic nanoparticle 42 shown in the center of FIG. 4, are of particular interest. These structures earn their name because the structure has an overall near-spherical geometry ("spheroid"); however, the surface is actually made up of smooth continuously curved junctions 44 between adjacent flat faces 46 ("polyhedral"). The curved junctions are characteristic of fullerenic, not graphite, structure. Thus the shells are interpreted to be giant fullerenes and the geometry, inferred from the HRTEM image of the shell cross sections, is icosahedral, i.e., a polyhedron having 20 faces. Accordingly, the observed vertices are locations of pentagonal rings, and the flat faces are polyaromatic sheets (of hexagons). The two clearly seen vertices 47, 48 of the polyhedron 42 in FIG. 4 are ~118° and ~130°, respectively, consistent with a view down an axis tilted from twofold symmetry axis.

Figure 5:
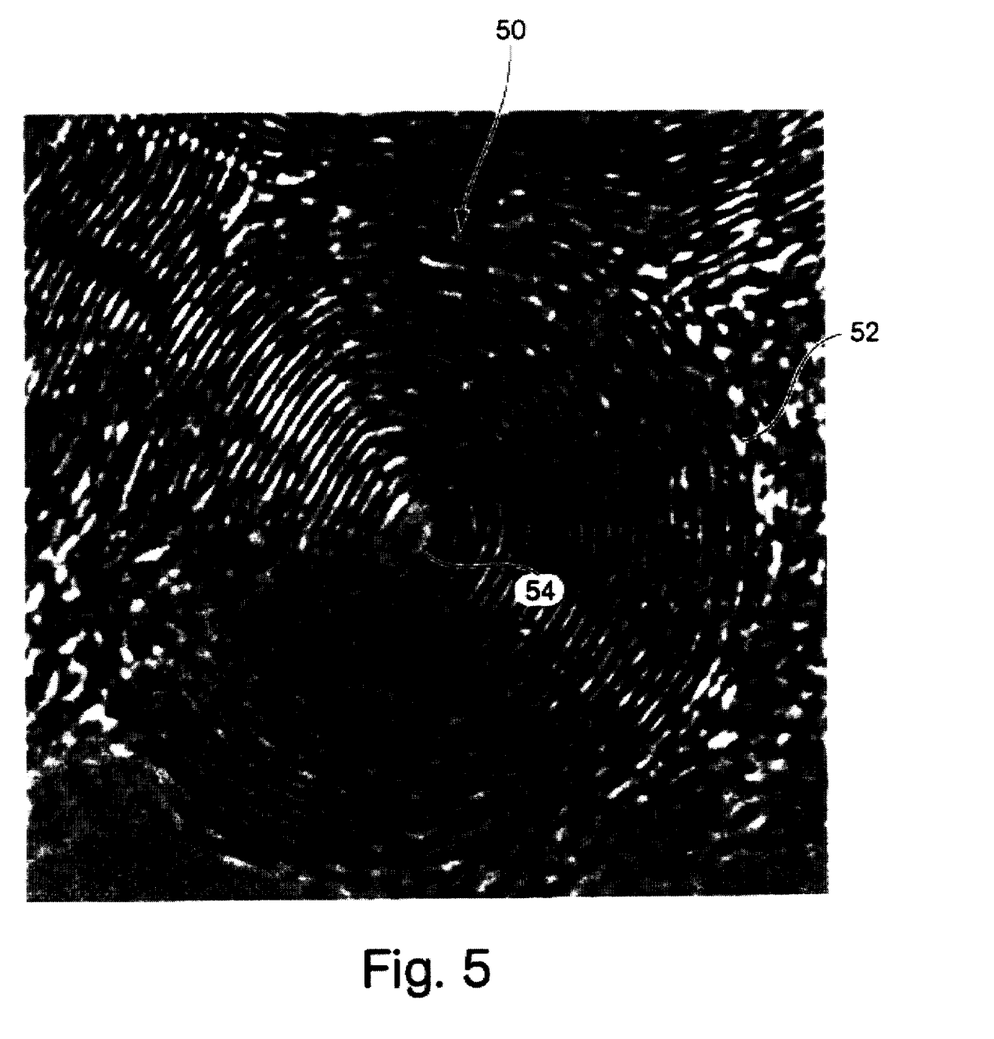
FIG. 5 is an electron micrograph of a spheroidal nested nanoparticle having concentric nested shells with a polyhedral core.
Figure 6:
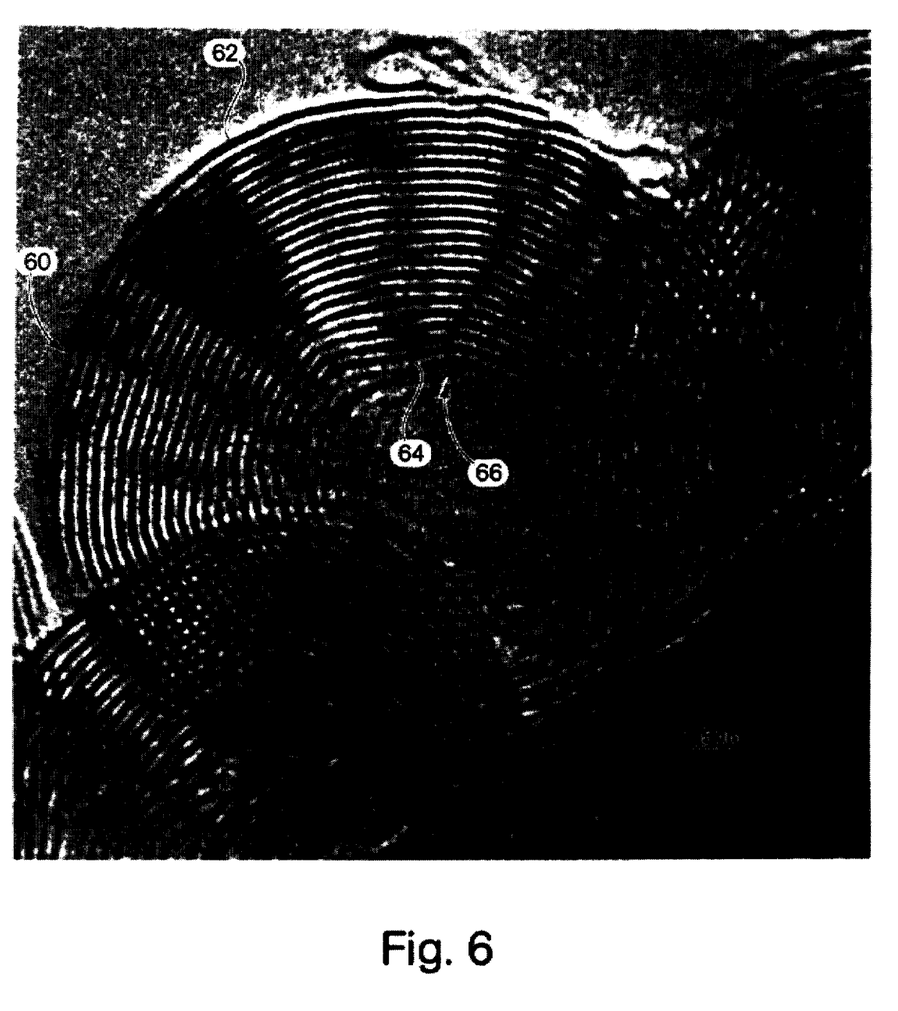
FIG. 6 is an electron micrograph of a spheroidal nested nanoparticle having concentric nested shells with a polyhedral core.

The geometry of the fullerenic nanoparticles can vary from innermost shell to outermost shell as demonstrated by nanoparticles 50 and 60, respectively, seen in FIGS. 5 and 6, respectively (produced under the same flame conditions as the nanotube 40). Nanoparticles 50 and 60 have substantially spherical outer shells 52 and 62, respectively; however, the innermost shells 54 and 64, respectively, are elongated polyhedrals. The innermost shell 54 of FIG. 5 is ~1.3 nm×2.1 nm (~$C_{330}$), while that of FIG. 6 (64) is ~5.5 nm×6.2 nm (~$C_{4200}$). The outermost shell 52 in FIG. 5 is ~19 nm×20 nm (~$C_{46,000}$), and the whole particle 50 consists of 22 shells with ~420,000 carbon atoms. The elongation becomes less apparent as more shells are added because the constant difference in the major and minor dimensions is then a diminishing fraction of the particle size.

The initial facets and angles of the core polyhedron are not replicated well during shell addition in these cases, especially FIG. 6. See, the spheroidal polyhedron 42 of FIG. 4 for comparison. For example, a vertex 66 of ~137° is clearly seen in the right side of the core shell of FIG. 6, but evolves to the smooth curvature of a sphere with the addition of a few shells. Small deviations from perfect replication of a polyhedral feature in the addition of each shell could account for the evolution of increasingly spherical shells. The implication that some nested carbon structures may consist of spherical, not polyhedral, shells might help to explain the striking sphericity of some nanotube end caps and nanoparticles.

Figure 7:
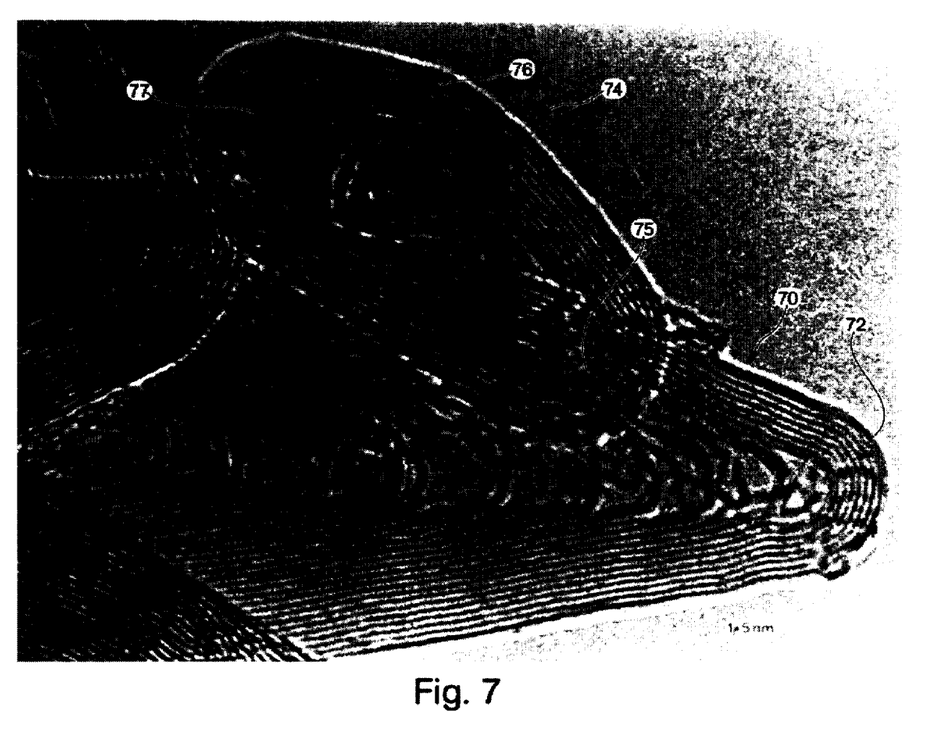
FIG. 7 is an electron micrograph of a nested conical nanostructure and of a nested trigonous nanostructure.
Figure 8:
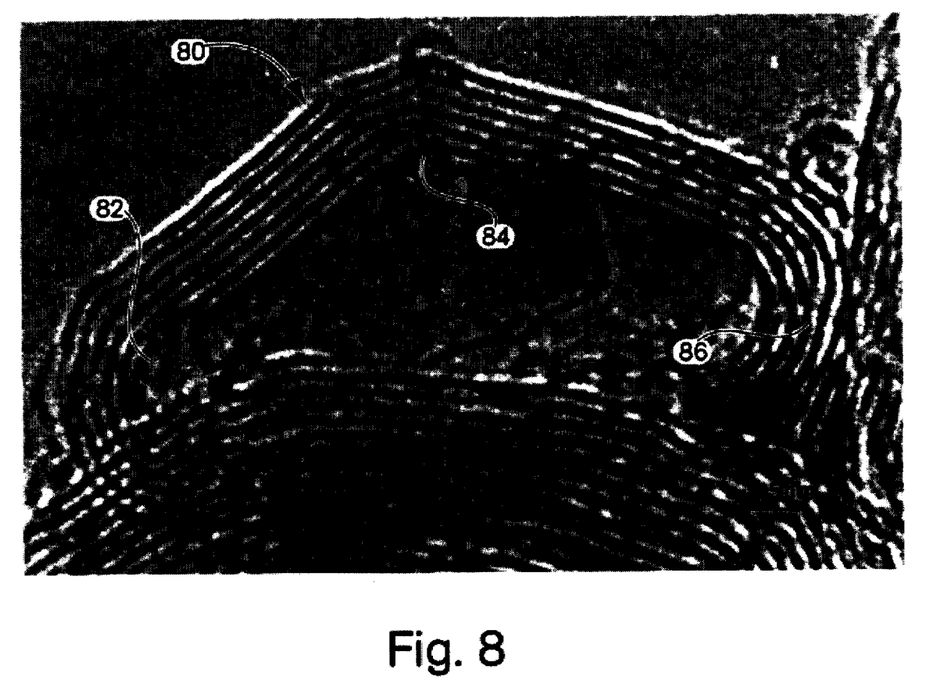
FIG. 8 is an electron micrograph of a nested trigonous nanostructure.

Other prevalent shapes found in flame-synthesized fullerenic nanostructures are nested conical tubes 70 (see, FIG. 7). Conical tube 70 appears open ended with a single cap 72 having a cone angle of 32°. Nested, remarkably trigonous, giant fullerenes 74 and 80 (see, FIGS. 7 and 8, respectively) have also been observed. Trigonous nanoparticle 74 has vertices 75, 76, 77 with angles of 16°, 147° and 17°, respectively. Trigonous nanoparticle 80 has vertices 82, 84, 86 with angles of 28°, 124° and 28°, respectively. The shells of trigonous nanostructures are believed to consist of two cones sharing both a common side and the same base.

Fullerenic nanostructures, including nested nanotubes and nested polyhedron structures, were observed in acetylene-oxygen flames under the following conditions: C/O ratio of 1.06; equivalence ratio of 2.65; chamber pressure of 20 torr; gas velocity of 50 cm/sec and no diluent. Samples were collected from the surface of the combustion chamber. Near closed-shelled giant fullerenes, both single and nested shells, were also present.

These nanostructures are not clearly observable in ethylene-oxygen flames under otherwise similar conditions (C/O=1.21; equivalence ratio=3.22; chamber pressure=20 torr; gas velocity=40 cm/sec and no diluent). However, fullerenic nanotubes in the early stages of formation were observed, suggesting that optimization of flame conditions would produce significant amounts of fullerenic nanostructures as well.

The above discussion establishes that a variety of fullerenic nanostructure have been obtained in benzene-oxygen flames. The yield of nested giant fullerenic nanostructures of tubular, spheroidal, elongated, or trigonous shape in fullerene forming benzene-oxygen flames is typically ~10% of the soot yield, and can be increased by adjusting flame conditions. Optimal flames are stabilized laminar flames in sub-atmospheric conditions and are considered to be sooting or near sooting flames.

It may be desirable to maximize the yield of fullerenic nanotube or other nanostructures by the preferential oxidation in the flame of non-fullerenic by-products. For example, beyond the post-flame zone, where most fullerenic nanostructures are produced, it is possible to establish a second oxidation zone, which would preferentially oxidize soot and enrich the flame products in fullerenes. Oxidation may be accomplished by introduction of air, oxygen or other oxidizing agent into the flames at a location downstream from the fullerenic nanostructure growth zone to promote the selective oxidation of graphitic carbon structures. Oxidative opening of the fullerenic tube end caps, also by introduction of air, oxygen, $CO_2$ or other oxidizing agent downstream from the fullerene nanostructure formation region is also contemplated. Oxidative opening of nanostructures is reported by Tsang et al. (*Nature* 362, 520–522 (Apr. 8, 1993)) and Ajayan et al. (*Nature* 362, 522–525 (Apr. 8, 1993)).

Figure 9:
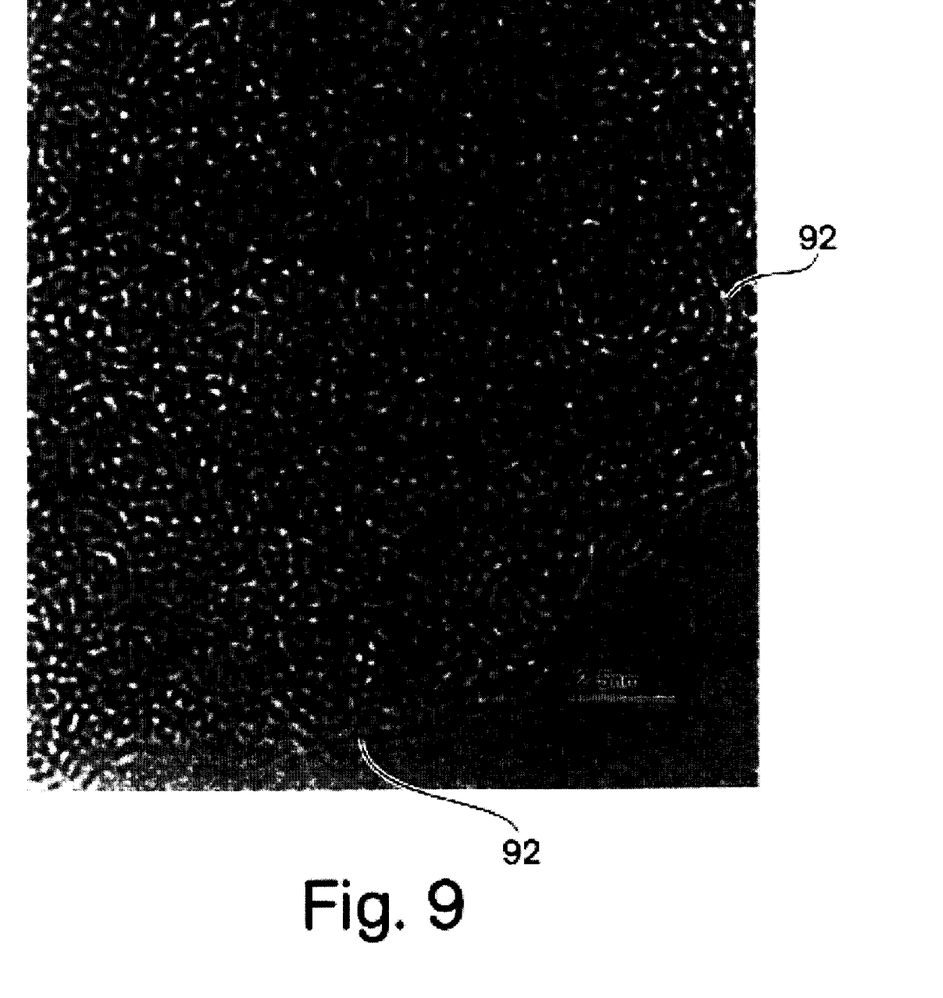
FIG. 9 is an electron micrograph of internal structure of soot showing curved fullerenic sheets.

Another important product of the unsaturated carbon-oxygen flames are continuous, smoothly curving layers or shells, i.e., fullerenic (i.e., hexagon- and pentagon-containing sheets) as distinct from flat graphitic (i.e., hexagon, only) carbon. Shells 90, 92 are prominent in soot from fullerene forming flames (FIG. 9: flame conditions of benzene/oxygen flame; C/O=0.99; P=97 torr; 43.5 % diluent (He/Ar=2.6)), i.e., flames forming fullerenes $C_{60}$, $C_{70}$ and larger structures including giant fullerenes, nanotubes and nanoparticles. Flame conditions and processing described above for the formation of fullerenic nanostructures may be used for the formation of fullerenic soot, as well. Importantly, the shells also are a significant part of the structure of soot from conventional turbulent flames (premixed turbulent ethylene/air flame at P=1 atm; C/O= 0.73; temperature =1705–1715 K; and residence time=18.8 ms).

Industrial applications favor the use of turbulent flames. Turbulent flames are much more economical when producing soot and the like in large tonnage quantity and may lead to a novel improved version of soot or carbon black, which has very important industrial applications.

The fraction of the internal structure of the soot represented by curved layers varies from almost 100% (greater than 90%) in strongly fullerene-forming benzene-oxygen flames to of order 50%, and with many of the shells subtending smaller angles, in conventional ethylene/air flames at atmospheric pressure. Observation of fullerenic sheets in soot formed in atmospheric pressure ethylene-air flames suggests that such sheets form under a wider range of conditions, e.g., higher pressures and less aromatic and less unsaturated fuels, than so fullerenic nanostructures.

Concentric as well as single curved shells are prevalent in both cases, but more so in the fullerene forming flame where the shells usually appear as giant fullerenes incompletely formed to various degrees. The soots from conventional flames contain significant amounts of conventional flat graphitic sheets. The distinction between smooth continuous fullerenic shells and graphitic quasi shells in conventional flame soot is based on comparison with the shell structures observed in the various nested nanostructures and in soots from fullerene forming flames.

The content of fullerenic relative to graphitic carbon and the degree of closure, mutual alignment and other characteristics of the shells in flame soots can be controlled by the adjustment of flame conditions. Such materials would appear to offer novel properties pertinent to some applications of carbon black, and they can be produced in large quantity with scaled-up combustion equipment.

While the properties of flame synthesized nested nanotubes and other nanostructures are yet to be measured, potential uses for these materials include uses as nanoconductors, as activated and reactive carbon sources, as fillers and reinforcing agents, and as catalysts. It is contemplated that, in order to accommodate any large-scale application of these materials, any of the nanostructures can be produced in large quantities in scaled-up flames operated under controlled conditions in continuous flow reactors.

What is claimed is:

1. A method for preparing soot, comprising the steps of:
combusting an unsaturated hydrocarbon fuel and an oxygen source in a non-arc-discharge burner chamber, thereby establishing a flame; and
collecting condensibles of the flame at a post-flame location, the condensibles comprising fullerenes, fullerenic nanostructures and soot; and
separating the soot from the condensibles, wherein the soot comprises at least 50 wt % fullerenic carbon sheets.

2. A method for preparing soot, comprising the steps of:
combusting an unsaturated hydrocarbon fuel and an oxygen source in a non-arc discharge burner chamber, thereby establishing a flame; and
collecting condensibles of the flame at a post-flame location; and
confirming the presence of fullerenic carbon sheets in the condensibles, wherein the condensibles comprise at least 50 wt % fullerenic carbon sheets.

3. A method for preparing soot, comprising the steps of:
combusting an unsaturated hydrocarbon fuel and an oxygen source in a non-arc discharge burner chamber at a chamber pressure of about atmospheric, thereby establishing a flame; and
collecting condensibles of the flame at a post-flame location, wherein the condensibles comprise at least 50 wt % fullerenic carbon sheets.

4. The method of claim 1 or 2, wherein the step of combusting an unsaturated hydrocarbon fuel and oxygen comprises combusting said unsaturated hydrocarbon fuel and oxygen in a burner chamber at a sub-atmospheric pressure.

5. The method of claim 1 or 2, wherein the step of combusting an unsaturated hydrocarbon fuel and oxygen comprises combusting said unsaturated hydrocarbon fuel and oxygen in a laminar flame.

6. The method of claim 1, 2, or 3, wherein the step of combusting an unsaturated hydrocarbon fuel and oxygen comprises combusting said unsaturated hydrocarbon fuel and oxygen in a turbulent flame.

7. The method of claim 1 or 2, wherein the step of combusting an unsaturated hydrocarbon fuel and oxygen comprises combusting said unsaturated hydrocarbon fuel and oxygen at atmospheric pressure.

8. The method of claim 1, 2, or 3, wherein said unsaturated hydrocarbon fuel is ethylene and the oxygen source is air.

9. The method of claim 1, 2 or 3, wherein the condensibles comprise greater than 90% fullerenic carbon sheets.

10. The method of claim 2, wherein the presence of fullerenic carbon sheets is confirmed by electron microscopy.

11. A method for preparing soot, comprising the steps of:
combusting an unsaturated hydrocarbon fuel and an oxygen source in a non-arc-discharge burner chamber, thereby establishing a flame, the flame conditions sufficient to produce at least 90 wt % fullerenic carbon sheets; and
collecting condensibles of the flame at a post-flame location, wherein the condensibles comprise at least 90 wt % fullerenic carbon sheets.

12. The method of claim 11, wherein said flame conditions include a chamber pressure of one atmosphere, a carbon-to-oxygen ratio of about 0.7, ethylene as the unsaturated hydrocarbon fuel and air as the oxygen source.

13. A soot comprising greater than 50 wt % fullerenic carbon sheets.

14. A soot comprising greater than 90 wt % fullerenic carbon sheets.

* * * * *

UNITED STATES PATENT AND TRADEMARK OFFICE
CERTIFICATE OF CORRECTION

PATENT NO. : 6,162,411
DATED : December 19, 2000
INVENTOR(S) : Jack B. Howard, John B. Vander Sande, K. Das Chowdhury Page 1 of 1

It is certified that error appears in the above-identified patent and that said Letters Patent is hereby corrected as shown below:

Column 1,
After title, the first paragraph of text should read as follows:

-- This invention was made with government support under Grant Number DE-FG02-84ER13282 awarded by the U.S. Department of Energy. The government has certain rights in the invention --.

Signed and Sealed this

Sixth Day of November, 2001

*Attest:*

NICHOLAS P. GODICI
*Acting Director of the United States Patent and Trademark Office*

*Attesting Officer*